United States Patent
Sit et al.

(10) Patent No.: US 6,217,924 B1
(45) Date of Patent: Apr. 17, 2001

(54) BREADMAKING MACHINE AND METHOD WITH AUTOMATED DISPENSER AND PAUSE FUNCTION

(75) Inventors: Michael Sit, Kowloon (HK); Leonard Dreimann, Lake Forest; Barbara A. Westfield, Chicago, both of IL (US)

(73) Assignee: Salton-Maxim Housewares, Inc., Mount Prospect, IL (US)

(*) Notice: Subject to any disclaimer, the term of this patent is extended or adjusted under 35 U.S.C. 154(b) by 0 days.

(21) Appl. No.: 09/562,053

(22) Filed: May 1, 2000

Related U.S. Application Data

(62) Division of application No. 09/304,215, filed on May 3, 1999, now Pat. No. 6,095,034, which is a division of application No. 08/711,130, filed on Sep. 9, 1996, now Pat. No. 5,947,005.

(51) Int. Cl.$^7$ .......................................................... A23L 1/00
(52) U.S. Cl. ............................................ 426/233; 426/523
(58) Field of Search .................................... 426/231, 233, 426/523; 99/326, 335, 348

(56) References Cited

U.S. PATENT DOCUMENTS

| | | | |
|---|---|---|---|
| 4,538,509 | 9/1985 | Ojima et al. | 99/348 |
| 4,762,057 | 8/1988 | Hirota et al. | 99/348 |
| 4,885,176 | 12/1989 | Nakakura et al. | 426/19 |
| 4,957,040 | 9/1990 | Nakakura et al. | 99/348 |
| 4,963,375 | * 10/1990 | Sato et al. | 426/233 |
| 5,435,235 | 7/1995 | Yoshida | 99/327 |
| 5,615,605 | 4/1997 | Kakimoto et al. | 99/348 |

* cited by examiner

*Primary Examiner*—George C. Yeung
(74) *Attorney, Agent, or Firm*—Michael J. Donohue; Seed IP Law Group PLLC

(57) ABSTRACT

A bread making machine having an automated dispenser unit and a pause function Is described. The automated dispenser unit is integrated within a chamber lid covering a bread making chamber in which bread making ingredients are mixed, kneaded, and baked. The automated dispenser accepts certain ingredients, such as fruit and/or nuts, which are automatically added to the bread making chamber after significant processing of other ingredients in the bread making chamber has occurred. The automatic dispenser unit includes a dispenser door adjacent to the bread making chamber. The dispenser door is held in a closed position by a latch assembly. The latch assembly is mechanically linked to a solenoid core, which moves in response to a control signal issued by electronic control circuitry, causing the dispenser door to open. The bread making machine includes a pause function, which allows a user to temporarily suspend the bread making operation at any time, by pressing a pause key on a user interface keyboard. The bread making operation resumes after a selected time interval has elapsed. The selected time interval may be determined either by the user or by the electronic control circuitry.

13 Claims, 6 Drawing Sheets

BREADMAKING MACHINE AND METHOD WITH AUTOMATED DISPENSER AND PAUSE FUNCTION

CROSS-REFERENCE TO RELATED APPLICATION

This application is a Divisional of U.S. patent application Ser. No. 09/304,215, filed May 3, 1999, now U.S. Pat. No. 6,095,034, which is a Divisional of U.S. patent application Ser. No. 08/711,130, filed Sep. 9, 1996, now U.S. Pat. No. 5,947,005.

TECHNICAL BACKGROUND

This invention relates generally to electrical appliances used in food preparation, and more particularly, to automatic bread making appliances.

BACKGROUND OF THE INVENTION

In recent years, automatic bread making machines have become increasingly prominent in the marketplace. These machines make bread without requiring a user to expend the time and effort associated with the mixing, repeated kneading, and baking. Bread making machines allow the user to pour the bread making ingredients into the machine, to press a few selected control buttons, and to leave the machine to do the work.

Developments in bread making machine technology have increasingly automated the entire bread making process, thereby requiring less and less user intervention. However, certain types of breads require different sets of ingredients to be combined at different times. Today's bread making machines provide for this by issuing audible signals indicating to the user that a next set of ingredients must be added to the bread making machine. At best, this is inconvenient. At worst, the bread may be ruined if the user does not add the ingredients at the proper time.

A related problem is that once a bread making cycle has begun, currently available bread making machines cannot be stopped without them being restarted at the beginning of the cycle. Therefore, it can be difficult to add previously forgotten ingredients. Also, a user cannot choose to extend the bread dough rising time beyond that of the preprogrammed bread making cycle.

It can be appreciated that there is a need for improved automation of bread making machines. It can also be appreciated that there is a need to allow user intervention in the bread making cycle, without then requiring the bread making machine to be restated at the beginning of the cycle. The present invention provides these and other advantages, as will be apparent from the following detailed description and accompanying figures.

SUMMARY OF THE INVENTION

According to the present invention, a bread making machine having an automated dispenser is provided to significantly improve the convenience of preparing certain times of breads. Ingredients such as fruit and/or nuts, which are typically added only near completion of bread dough kneading, are placed in a dispenser unit separate from a bread making chamber, in which the other bread making ingredients are contained. The automated dispenser includes a dispenser case for holding the fruit and/or nuts and a dispenser door separating the dispenser case from the bread making chamber of the bread machine. The dispenser door is held closed by a door latch, which responds to an electric signal to open the dispenser door, thereby emptying the fruit and/or nuts into the bread making chamber.

An automatic bread making machine, according to the present invention, includes a bread making chamber having a top opening for receiving a first set of bread making ingredients. A dispenser unit holds a second set of bread making ingredients and empties these ingredients into the bread making chamber in response to an electric signal produced by electronic control circuitry. A motor is provided for mixing ingredients within the bread making chamber, and a heater is provided for baking the ingredients within the chamber. The electronic control circuitry controls the operation of the motor and the heater. Also provided is a user interface panel including a keyboard and a visual display. The keyboard provides a means for the user to enter certain bread making instructions, and the visual display provides bread making status information to the user.

Also in accordance with the present invention, the operation of the bread making machine may be temporarily suspended at any time during the bread making process, by receipt of a pause instruction from the user. One advantage of this feature is that the bread making process can be stopped temporarily to add ingredients or for observation, without having to restart the entire bread making cycle over again. The user interface panel keyboard includes a pause key which is actuated by the user to transmit the pause instruction to the electronic control circuitry. The electronic control circuitry includes a microcomputer which executes a bread making program. The microcomputer responds to the pause instruction by suspending execution of the bread making program for a selected time interval, and resuming execution of the bread making program after the selected time interval has elapsed. The selected time interval be determined either by the user or automatically by the electronic control circuitry.

DETAILED DESCRIPTION OF THE INVENTION

Figure 1:
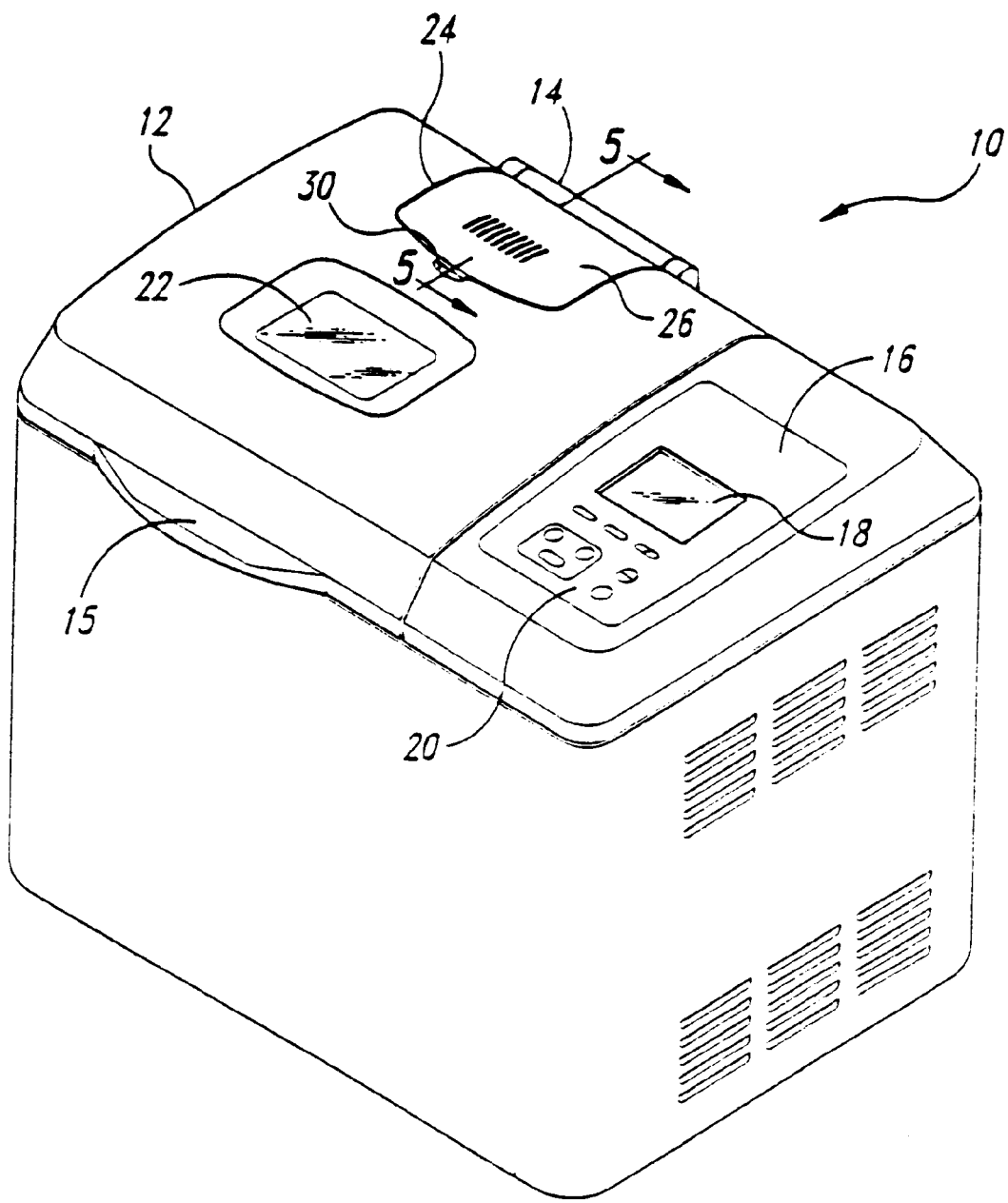
FIG. 1 depicts a bread making machine according to the present invention.

FIG. 1 shows a bread making machine 10 in accordance with the present invention. The bread making machine 10 includes a chamber lid 12 which covers a bread making chamber in which the various bread making ingredients are mixed and baked. The lid 12 is pivotally mounted on hinge 14 and includes a handle 15 to provide user access to the bread making chamber within the bread making machine 10. The bread making machine 10 includes a user interface panel, such as control panel 16. The control panel 16 includes a display unit 18 for displaying bread making selections made by the user, as well as displaying the status of bread making operations. The control panel 16 also includes a keyboard 20 with which the user is able to select certain bread making instructions. The lid 12 also includes a window 22 through which a user can observe the bread making procedure.

Integrated within the lid 12 is an automated dispenser unit 24. The dispenser unit 24 includes a pivotally mounted dispenser lid 26. An aperture 30 within the lid 12 conveniently allows a user to lift open the dispenser lid 26, thereby providing access to the interior of dispenser unit 24, described in detail below. The dispenser unit 24 receives a set of bread making ingredients, such as nuts and/or fruit, which is added to the bread making chamber only after significant processing of other bread making ingredients contained within the bread making chamber.

Figure 2:
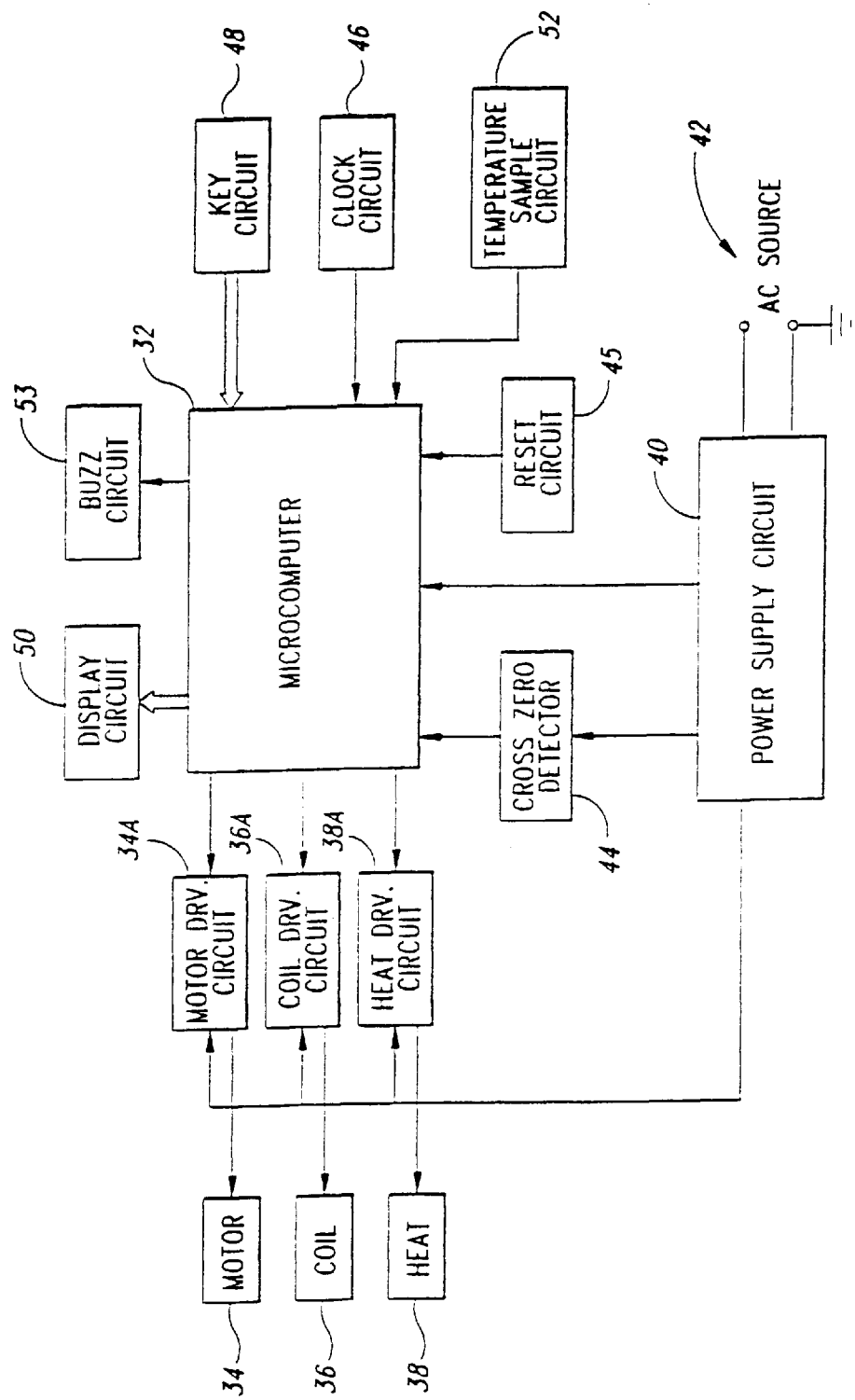
FIG. 2 is functional block diagram depicting the electronic control and other circuitry contained within the bread making machine of FIG. 1.

FIG. 2 is a functional block diagram which depicts the basic electronic circuit components contained within the bread making machine 10 of FIG. 1. Electronic control circuitry includes a microcomputer 32 which controls the functioning of an electric motor 34, a solenoid coil 36, and a heat unit 38 via respective electronic drive circuits 34A–38A. The microcomputer 32 is powered by a power supply circuit 40, which also powers the motor drive circuit 34A, coil drive circuit 36A, and heat drive circuit 38A. The power supply circuit 40 is preferably connected to an external AC electrical source 42, such as a 120 V, 50–60 Hz source. The power supply 40 provides both DC power to the microcomputer 32 and AC power to the drive circuits 34A–38A. The AC power output of the power supply circuit 40 is monitored by a zero crossing detector 44 coupled with the microcomputer 32, thereby allowing the microcomputer to adjust the speed of the motor 34 in a well-known manner.

The microcomputer 32 includes software instruction processing means, such as a microprocessor, for executing a series of preprogrammed bread making instructions which are stored in a data/instruction storage means, such as a computer register or memory. Before beginning execution of the bread making instructions, the microcomputer 32 is placed in an initialized state by a reset circuit 45 in conventional fashion. The microcomputer 32 receives a clock signal input from a clock circuit 46, receives user instructions from the keyboard 20 (see FIG. 1) via a keyboard circuit 48, and displays bread making status information on the display unit 18 (see FIG. 1) via a display circuit 50. The microcomputer 32 also receives one or more signals from a temperature sample circuit 52 and adjusts the operation of the heat unit 38 accordingly. The microcomputer 32 can communicate status information audibly, such as an end-of-cycle tone, via a buzz circuit 53.

Each of the circuits whose function and interconnection is described in connection with FIG. 2 is of a type known in the art, and one skilled in the art would be able to use such circuits in the described combination to practice the present invention. The internal details of these particular circuits are not part of, nor critical to, the invention. Therefore, a detailed description of the internal circuit operation is not required. Instead, those skilled in the art will appreciate that significant advantages are achieved by, for example, providing the solenoid coil 36 and drive circuitry 36a under control of the microcomputer 32, together with associated software instruction execution by the microcomputer.

Figure 3:
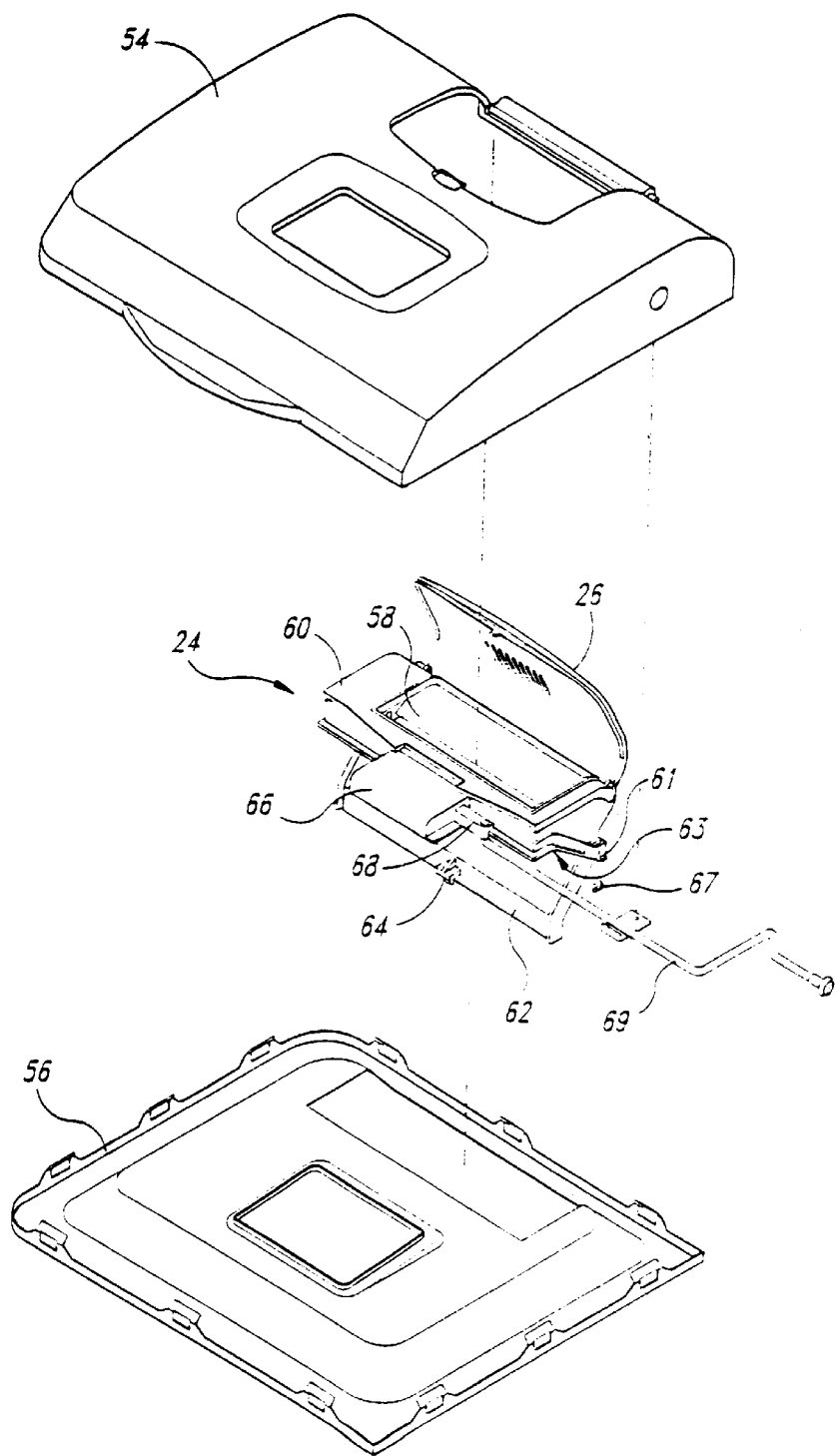
FIG. 3 is an exploited view of an automated dispenser unit and a chamber lid according to the present invention.

FIG. 3 is an exploded view drawing showing the dispenser unit 24 positioned between an outer lid portion 54 and an inner lid portion 56 of the chamber lid 12. The dispenser lid 26 is shown in an open position and reveals an upper opening 58 of a dispenser case 60. The dispenser 24 also includes a disperser door 62, shown in the open position. The dispenser door 62 is pivotally mounted to the dispenser case 60 by hinge pins 61 held by retainer clips 67. The dispenser door 62, when closed, covers a lower opening 63 in the dispenser case 60. When the dispenser door is in the closed position, a latch hook 64 engages a door latch assembly 65 (see FIGS, 4 and 5), a portion of which protrudes from a latch assembly housing 66 of the dispenser unit 24. As will be described in detail below, the door latch assembly is actuated by a wedge 68, which is linked to, and mechanically actuated by, a push rod 69.

Figure 4:
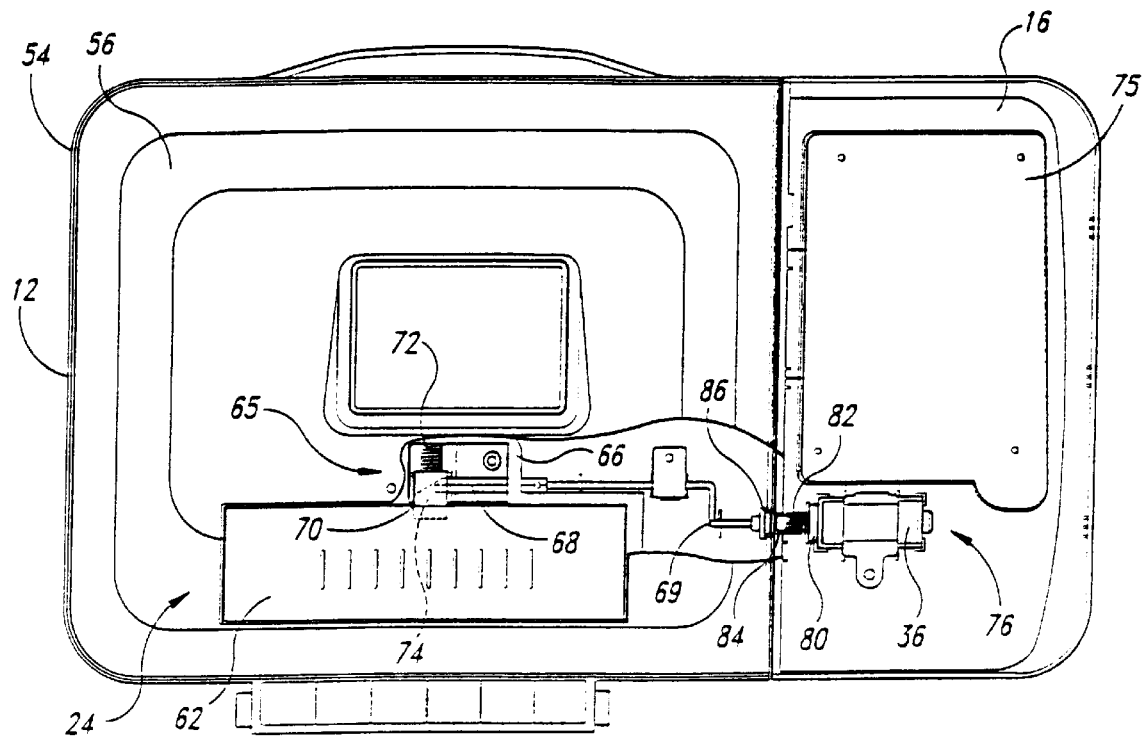
FIG. 4 is an underside view of the automated dispenser integrated within the chamber lid.
Figure 5:
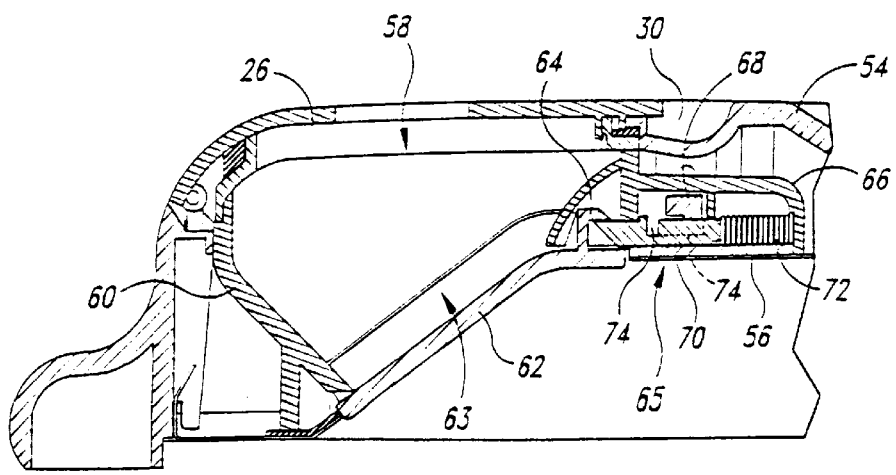
FIG. 5 is a cross-sectional view of the automated dispenser.

FIG. 4 shows an underside view of the dispenser unit 24 integrated within the chamber lid 12, and also shows an underside view of the control panel 16. A portion of the inner lid 56 and the latch assembly housing 66 has been omitted to provide a view of the latch assembly 65 and its interaction with the wedge 68. The latch assembly 65 includes a latch slide 70 and a latch spring 72. As also seen in the cross-sectional view shown in FIG. 5, the latch spring 72 biases the latch slide 70 into engagement with the latch hook 64 to maintain the dispenser door 62 in a closed position over the lower opening 63 of the dispenser case 60. The latch slide 70 has a tapered groove 74 which receives the wedge 68.

Referring to FIG. 4, a printed circuit board (PCB) shield 75 supports the microcomputer 32 and other electronic control circuitry (see FIG. 2) within the control panel 16. Adjacent to the PCB shield 75 is a solenoid 76, including the solenoid coil 36 and a movable core or plunger 80. A plunger spring 82 biases the plunger 80 in a direction away from the push rod 69. Upon electrically energizing the solenoid coil 36, the plunger 80 is moved in a direction opposite to the bias of the plunger spring 82 and a first-plunger head 84 on the plunger pushingly engages a second plunger head 86 attached to the other end of the push rod 69. The first and second plunger heads 84, 86 are not physically connected, thereby allowing pivotal rotation of the chamber lid 12 relative to the control panel 16 (see FIG. 1). Energizing the solenoid coil 36 causes the push rod 69 to move the wedge 68 further within the tapered groove 74 of the latch slide 70, which in turn causes the latch slide 70 to move in a direction opposite the bias of the latch spring 72, thereby releasing the latch hook 64 of the dispenser door 62 (see FIG. 5). The dispenser door 62 then swings open and any bread making ingredients contained within the dispenser case 60 are emptied in to the bread making chamber.

The automated dispenser unit 24 of the bread making machine 10 according to the present invention affords numerous advantages over prior art bread making machines. Previously, any breads containing, for example, fruit and/or nuts required the bread making machine to issue an audible signal indicating to the user the appropriate time it which to add the fruit and/or nuts during a bread dough kneading cycle. Thus, the present invention provides superior automated bread making by allowing the user to insert ingredients, such as fruit and/or nuts, into the automated dispenser unit 24 at any convenient time prior to the appropriate time during the kneading cycle. The ingredients are then automatically added to the contents of the bread making chamber under control of the microcomputer 32 of FIG. 2, and no further user intervention is required.

Figure 6:
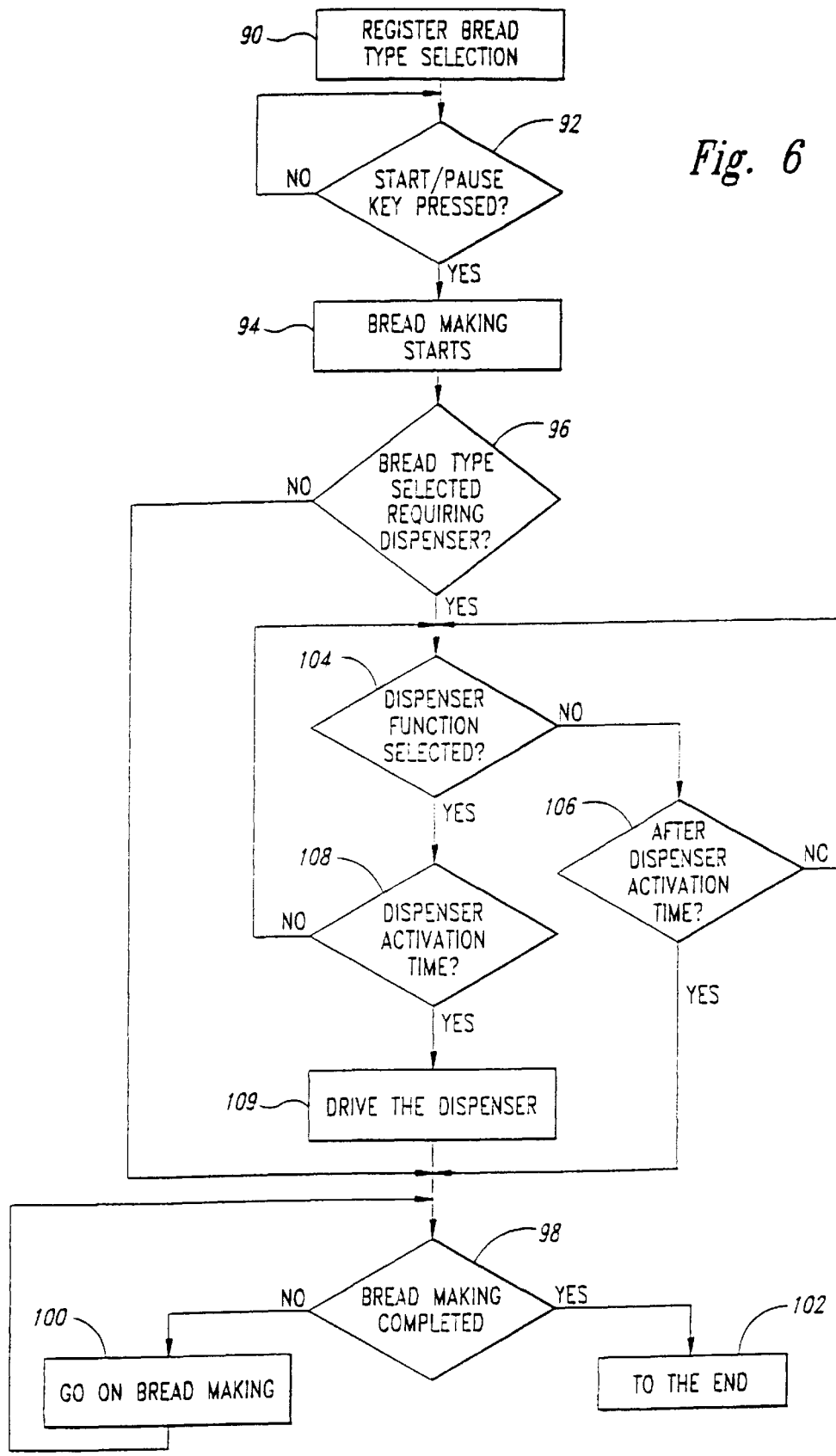
FIG. 6 is a software flowchart diagram depicting the electronic control circuitry operation of the automated dispenser unit.

Referring again to FIG. 2, the microcomputer 32 executes a series of preprogrammed bread making instructions and correspondingly controls the operation of units such as the motor 34, solenoid coil 36, heat unit 38, display unit 13 (see FIG. 1), etc. One set of such bread making instructions includes operation of the automated dispenser unit 24, and is depicted in FIG. 6. A user may select any of a variety of bread making cycles by using the keyboard 20 (see FIG. 1). The key circuit 48 communicates the selection to the microcomputer 32 where the selection is registered therein in step 90. In step 92, the microcomputer 32 then inquiries whether a start key has been actuated by the user. In the preferred embodiment of the present invention, a multifunction key for both start and pause functions is employed. The pause function is described below in connection with FIG. 7.

If the start key is actuated, the bread making operation commences in step 94. In a conditional branch step 96, the microcomputer 32 determines whether one of a plurality of bread types has been selected which may require use of the dispenser unit 24. If not, the selected bread making operation continues with steps 98 and 100 until the end of the bread making operation at step 102. If a selected bread type may require use of the dispenser unit 24, the microcomputer 32 proceeds to a conditional branch step 104, in which it is determined whether the automated function of the dispenser unit 24 has been expressly selected/deselected. In the preferred embodiment of the present invention, selection of a bread type which may require use of the dispenser unit 24 results in a default selection of the dispenser unit function. The user may then deselect the automated function of the dispenser unit 24, or toggle between selected and deselected states, by actuating a dispenser select key included in the keyboard 20 (see FIG. 1). Since the selection/deselection can be made at any time prior to a dispensing time during the kneading cycle, the test of step 104 is repeated until that dispensing time. If the automated function of the dispensing unit 24 has not been selected, the conditional test of step 106 returns to step 104 until the dispensing time has passed. In the event the automated function of the dispenser unit 24 has been selected, a conditional test of step 108 also returns to step 104 since the automated function of the dispenser unit may be deselected at any time prior to the dispensing time. If the automated function of the dispenser unit 24 has been selected, the microcomputer 32, in step 109, causes the coil drive circuitry 36A to energize the solenoid coil 36 (see FIGS. 2 and 4), thereby emptying the contents of the dispenser unit 24 into the bread making chamber. The bread making operation then continues with steps 98–102 as described above.

The bread making machine 10 according to the present invention also incorporates a novel pause function, allowing a user to temporarily suspend the bread making operation at any time, and to resume the bread making operation at a later time. Prior art bread making machines do not incorporate such a feature, and do not allow temporary interruption of bread making operation to, for example, add previously forgotten ingredients. Once bread making operations have begun in prior art bread making machines, they must continue to the end or be started again from the beginning. It will be appreciated that the pause function provided by the present invention affords significant advantages over the prior art.

Figure 7:
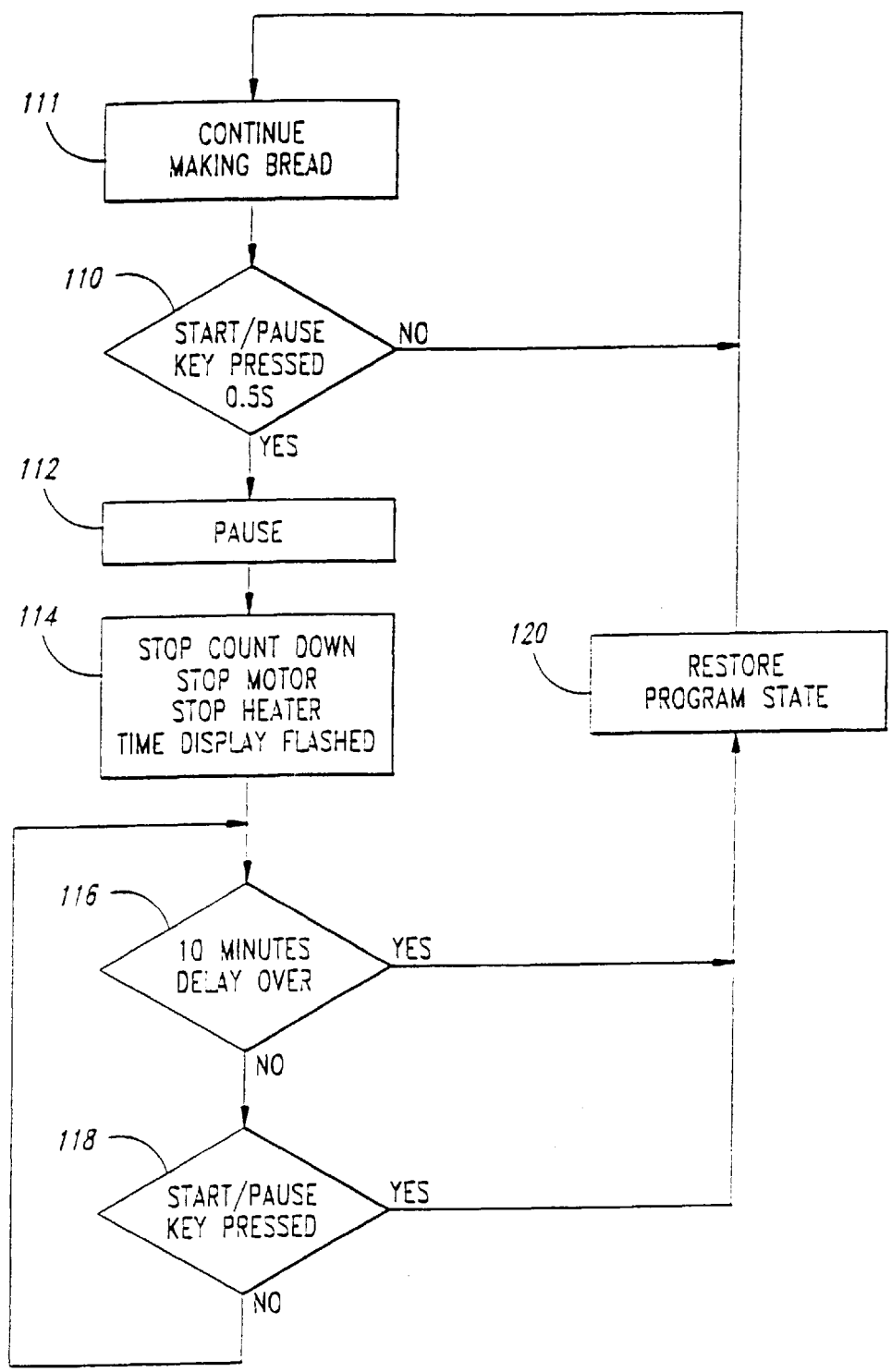
FIG. 7 is a software flowchart diagram depicting the electronic control circuitry operation of a pause function of the bread making machine of FIG. 1 .

FIG. 7 depicts a sequence of operations performed by the microcomputer 32 of FIG. 2 to provide the pause function. A conditional branch test of whether the user has actuated a pause key of the keyboard 20 (see FIG. 1) is performed in step 110. If not, the bread making operation is allowed to continue in step 111. If the user has actuated the pause function, preferably for a minimum time interval such as 0.5 seconds, the operation of the microcomputer 32 is paused in step 112. The program state of the microprocessor within the microcomputer 32 is saved, for example, by saving the values of instruction pointer and flag registers within the microcomputer. A pause subrouting 114 is then executed by the microcomputer 32, in which the timing of bread making operations is suspended, the motor 34 and/or heater 38 is stopped, and the display unit 18 conveys the paused state of the bread making machine to the user. A program loop comprising steps 116 and 118 then determines whether a predetermined time delay has occurred or the pause key has again been actuated by the user, respectively. If either of these events occurs, the bread making program state of microcomputer 32 is restored at step 110 and the bread making operation resumes in step 111.

It will be appreciated that although an embodiment of the invention has been described above for purposes of illustration, various modifications may be made without deviating from the spirit and scope of the invention. Those skilled in the art will appreciate that a number of different automated disperser mechanisms could be employed according to the present invention. For example, a dispenser unit with discrete compartments for different sets of ingredients to be added to the bread at different times is well within the contemplation of the present invention. Also, the dispenser unit may have a different mechanical structure from that described above, while still providing the function of the present invention—namely, automatically dispensing certain bread making ingredients into the bread making chamber only after significant processing of other ingredients in the bread making chamber has occurred. For example, a rotating dispenser unit could be employed. Such a unit would include a compartment with an opening facing away from the bread making chamber prior to the dispensing time, and then rotating the compartment into a position where the opening faces toward the bread making chamber at the dispensing time. Indeed, numerous variations are well within the scope of this invention.

It will also be appreciated that the automated dispenser of the present invention can be included in any of numerous electrical kitchen appliances which mix together various ingredients at different times. Some examples include pasta makers, ice cream makers, yogurt makers, electronic stand mixers, food processors, bagel makers, and dough makers.

Similarly, the pause function of the present invention can be incorporated into any of a wide variety of electrical kitchen appliances, including those examples identified above. As another example, a bread toaster having the pause function would allow a user to check the process of the bread toasting without effecting the total time for which the bread is toasted. Indeed, the pause function may be advantageously employed any time a user wishes to check the status of kitchen appliance operations without interfering with the overall timing and sequence of these operations.

It will be appreciated that, although FIGS. 6 and 7 depict a continuous computer program execution, an interrupt driven protocol may be advantageously employed. In particular, the pause function execution depicted in FIG. 7 may be provided by performing a first interrupt service request (ISR) routine open upon receipt of the first actuation of the pause key, and executing a second ISR routine upon receipt of the second actuation of the pause key or expiration of a timer. As with the automated dispenser unit, the pause function according to the present invention may be achieved by numerous variations within the scope of this invention. Accordingly, the invention is not limited except as by the appended claims.

What is claimed is:

1. A method of baking bread in an automatic bread making machine having control circuitry operable to respond to bread making instructions from a user, comprising:

receiving bread making ingredients in a bread making chamber of the bread making machine;

in response to a start instruction, activating the control circuitry to begin execution of a bread making sequence;

in response to a pause instruction at any time in the bread making sequence, signaling the control circuit to suspend execution of the bread making sequence for a selected time interval; and after the selected time interval has elapsed, signal the control circuitry to resume execution of the bread making sequence.

2. The method of claim 1 wherein the selected time interval is determined by the user.

3. The method of claim 1 wherein the control circuitry comprises a microcomputer and the selected time interval is determined by the microcomputer.

4. The method of claim 1 wherein the control circuitry comprises a user interface panel includes a keyboard having a pause key actuatable by the user to transmit the pause instruction to the control circuitry.

5. The method of claim 1 wherein suspending execution of the bread making sequence includes the step of storing a current state of the bread making sequence, and wherein resuming execution of the bread making sequence includes the step of restoring the current state of the bread making sequence.

6. The method of claim 1, further comprising:

receiving additional ingredients into a dispenser positioned adjacent to the bread making chamber;

mixing the bread making ingredients for a selected time interval; and transferring the additional ingredients from the dispenser into the bread making chamber in response to a control signal issued by the control circuitry.

7. The method of claim 6, wherein transferring the additional ingredients includes the step of opening a door separating the dispenser from the bread making chamber.

8. The method of claim 7 wherein opening the door includes the step of energizing a solenoid.

9. The method of claim 6, wherein transferring the additional ingredients includes the step of rotating the dispenser.

10. A method of baking bread in a bread making machine having control circuitry, including a pause key operable by a user, comprising:

receiving bread making ingredients in a bread making chamber of the bread making machine;

activating the control circuitry to begin execution of a bread making sequence;

in response to user activation of the pause key, signaling the control circuitry to suspend execution of the bread making sequence at any time in the bread making sequence for a selected time interval; and after the selected time interval has elapsed, signaling the control circuitry to resume execution of the bread making sequence.

11. The method of claim 10, wherein the selected time interval is determined by the user.

12. The method of claim 10, wherein the control circuitry comprises a microcomputer and the selected time interval is determined by the microcomputer.

13. The method of claim 10, wherein suspending execution of the bread making sequence comprises storing a current state of the bread making sequence, and wherein resuming execution of the bread making sequence comprises restoring the current state of the bread making sequence.

* * * * *

UNITED STATES PATENT AND TRADEMARK OFFICE
CERTIFICATE OF CORRECTION

PATENT NO. : 6,217,924 B1
DATED : April 17, 2001
INVENTOR(S) : Michael Sit et al.

It is certified that error appears in the above-identified patent and that said Letters Patent is hereby corrected as shown below:

Column 7,
Line 7, "control circuit to" should read -- control circuitry to --.
Line 10, "elapsed, signal the" should read -- elapsed, signaling the --.

Column 8,
Line 6, "The method of claim 6, wherein" should read -- The method of claim 6 wherein --.
Line 25, "The method of claim 10, wherein" should read -- The method of claim 10 wherein --.
Line 27, "The method of claim 10, wherein" should read -- The method of claim 10 wherein --.

Column 8,
Line 30, "The method of claim 10, wherein" should read -- The method of claim 10 wherein --.

Signed and Sealed this

Second Day of August, 2005

JON W. DUDAS
*Director of the United States Patent and Trademark Office*